US008818261B1

(12) United States Patent
Chen et al.

(10) Patent No.: US 8,818,261 B1
(45) Date of Patent: *Aug. 26, 2014

(54) CONFIGURATION OF A NETWORK DEVICE

(75) Inventors: James Chieh-Tsung Chen, Santa Clara, CA (US); Chor-Teck Law, San Jose, CA (US); Brian Bosso, San Jose, CA (US); May Chiang, San Jose, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 13/411,014

(22) Filed: Mar. 2, 2012

Related U.S. Application Data

(62) Division of application No. 10/961,777, filed on Oct. 8, 2004, now Pat. No. 8,131,209.

(51) Int. Cl.
*H04B 7/15* (2006.01)

(52) U.S. Cl.
USPC ........................................................ 455/11.1

(58) Field of Classification Search
USPC ........ 455/424, 425, 456.5, 456.6, 561, 550.1, 455/575.1, 11.1, 13.4, 24, 276.1, 16, 440, 455/435.1, 414.1, 432.1, 439, 442, 452.1, 455/453, 456.2, 67.11, 522, 69, 70, 95, 422, 455/560; 375/211, 215, 356, 132; 370/315, 370/318, 389, 338, 232, 423, 311, 312, 349
See application file for complete search history.

(56) References Cited

U.S. PATENT DOCUMENTS

| | | | |
|---|---|---|---|
| 4,905,302 A | 2/1990 | Childress et al. | |
| 5,140,589 A | 8/1992 | Otsuka | |
| 5,832,365 A | 11/1998 | Chen et al. | |
| 5,881,095 A * | 3/1999 | Cadd | 375/132 |
| 6,128,512 A * | 10/2000 | Trompower et al. | 455/561 |
| 6,141,531 A | 10/2000 | Williams et al. | |
| 6,175,571 B1 * | 1/2001 | Haddock et al. | 370/423 |
| 6,301,514 B1 * | 10/2001 | Canada et al. | 700/108 |
| 6,571,284 B1 * | 5/2003 | Suonvieri | 709/221 |
| 6,751,456 B2 | 6/2004 | Bilgic | |
| 6,928,295 B2 * | 8/2005 | Olson et al. | 455/522 |
| 6,934,752 B1 | 8/2005 | Gubbi | |
| 7,092,434 B2 | 8/2006 | Moon et al. | |
| 7,209,703 B1 * | 4/2007 | Yarkosky | 455/9 |
| 7,280,799 B1 * | 10/2007 | Najafi et al. | 455/11.1 |
| 7,283,816 B2 * | 10/2007 | Fok et al. | 455/423 |
| 7,376,122 B2 | 5/2008 | Draves et al. | |
| 7,797,386 B2 * | 9/2010 | Burns | 709/206 |

(Continued)

OTHER PUBLICATIONS

"System Requirements for IEEE 802.20 Mobile Broadband Wireless Access Systems—Version 14", IEEE Standards Working Group 802. 20, Jul. 16, 2004, vol. 16.

(Continued)

*Primary Examiner* — Ankur Jain

(57) ABSTRACT

In one aspect, a wireless station includes a transmitter to wirelessly transmit discovery packets to a proximately located network device, a receiver to wirelessly receive an input from the proximately located network device, an engine to manage a configuration of the network device, and a power selector to control a power level output by the transmitter, enable transmission at a first power during configuration of the proximately located network device, and enable transmission at a second power after configuration of the proximately located network device, wherein the first power is different than the second power, and the first power helps prevent snooping during the configuration.

11 Claims, 6 Drawing Sheets

(56) References Cited

U.S. PATENT DOCUMENTS

| | | |
|---|---|---|
| 8,238,287 B1 | 8/2012 | Gopi et al. |
| 2002/0086648 A1 | 7/2002 | Wilhelmsson et al. |
| 2003/0010817 A1 | 1/2003 | Lingle et al. |
| 2003/0013410 A1* | 1/2003 | Park ............................ 455/11.1 |
| 2003/0025602 A1* | 2/2003 | Medema et al. ........... 340/568.1 |
| 2003/0103521 A1 | 6/2003 | Raphaeli et al. |
| 2003/0108017 A1 | 6/2003 | Famolari |
| 2003/0123401 A1 | 7/2003 | Dean |
| 2003/0157894 A1* | 8/2003 | Han et al. ..................... 455/67.1 |
| 2003/0195702 A1 | 10/2003 | Koga |
| 2003/0214905 A1 | 11/2003 | Solomon et al. |
| 2004/0110469 A1 | 6/2004 | Judd et al. |
| 2004/0125779 A1 | 7/2004 | Kelton et al. |
| 2004/0202141 A1 | 10/2004 | Sinivaara et al. |
| 2004/0240417 A1 | 12/2004 | Kim |
| 2004/0255192 A1 | 12/2004 | Watanabe et al. |
| 2004/0266340 A1 | 12/2004 | Ivanov et al. |
| 2005/0018651 A1 | 1/2005 | Yan et al. |
| 2005/0053025 A1 | 3/2005 | Duffy et al. |
| 2005/0094663 A1 | 5/2005 | Rahman et al. |
| 2005/0273790 A1* | 12/2005 | Kearney et al. ................ 719/328 |
| 2006/0007914 A1 | 1/2006 | Chandra et al. |
| 2006/0039333 A1 | 2/2006 | Pirzada et al. |
| 2006/0063484 A1 | 3/2006 | Proctor et al. |
| 2006/0064730 A1 | 3/2006 | Rael et al. |
| 2006/0064739 A1 | 3/2006 | Guthrie et al. |
| 2006/0067226 A1 | 3/2006 | Chandra et al. |
| 2006/0098592 A1* | 5/2006 | Proctor, Jr. et al. ........... 370/315 |
| 2006/0182108 A1* | 8/2006 | Krumel ........................ 370/389 |
| 2006/0205342 A1 | 9/2006 | McKay et al. |
| 2006/0205348 A1* | 9/2006 | Maxwell ......................... 455/15 |
| 2006/0276211 A1 | 12/2006 | Gallo |
| 2007/0008889 A1 | 1/2007 | Seo |
| 2007/0025486 A1 | 2/2007 | Gainey et al. |
| 2007/0066220 A1* | 3/2007 | Proctor et al. ................ 455/11.1 |

OTHER PUBLICATIONS

"Part 16: Air Interface for Fixed Broadband Wireless Access Systems", IEEE 802.16, IEEE Standard for Local and Metropolitan Area Networks, Oct. 1, 2004.

"Information technology—Telecommunications and information exchange between systems—Local and metropolitan area networks—Specific requirements—Part 11: Wireless LAN Medium Access Control (MAC) and Physical Layer (PHY) specifications," IEEE Std. 802.11 (1999).

"Part 11: Wireless LAN Medium Access Control (MAC) and Physical Layer (PHY) specifications: High-Speed Physical Layer in the 5 GHz Band," IEEE Std. 802.11a (1999).

"Part II: Wireless LAN Medium Access Control (MAC) and Physical Layer (PHY) specifications: Higher-Speed Physical Layer Extension in the 2.4 GHz Band," IEEE Std. 802.11b (1999).

"Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band," IEEE Std. 802.11g (2003).

"TGn Sync Proposal Technical Specification," IEEE Std. 802.11n (2005).

* cited by examiner

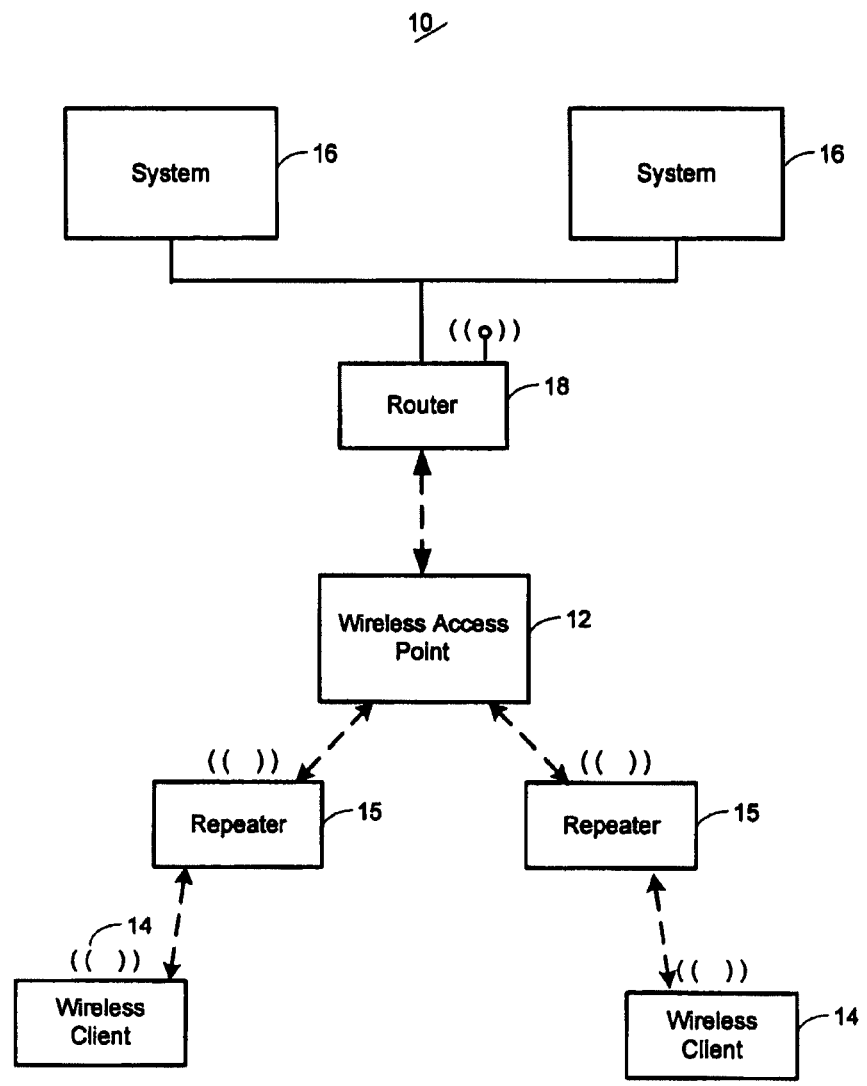
FIG. _1

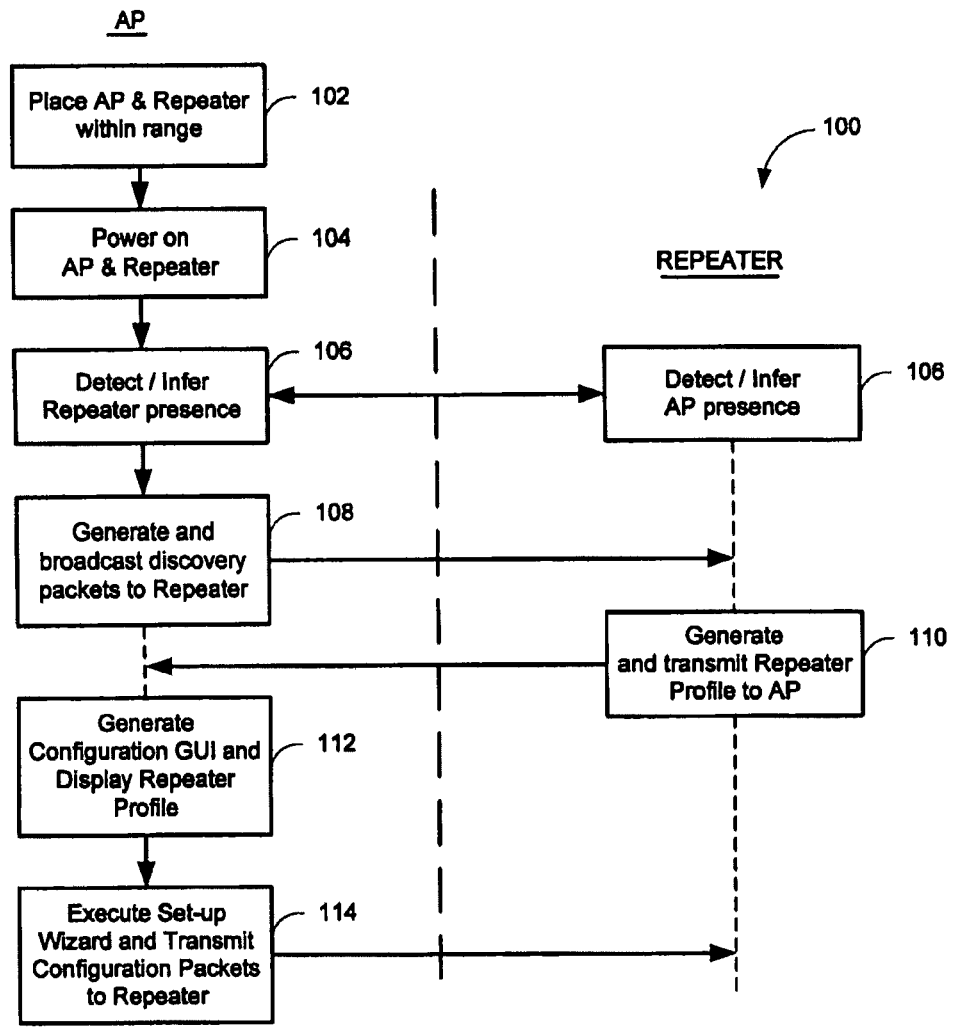
FIG._3

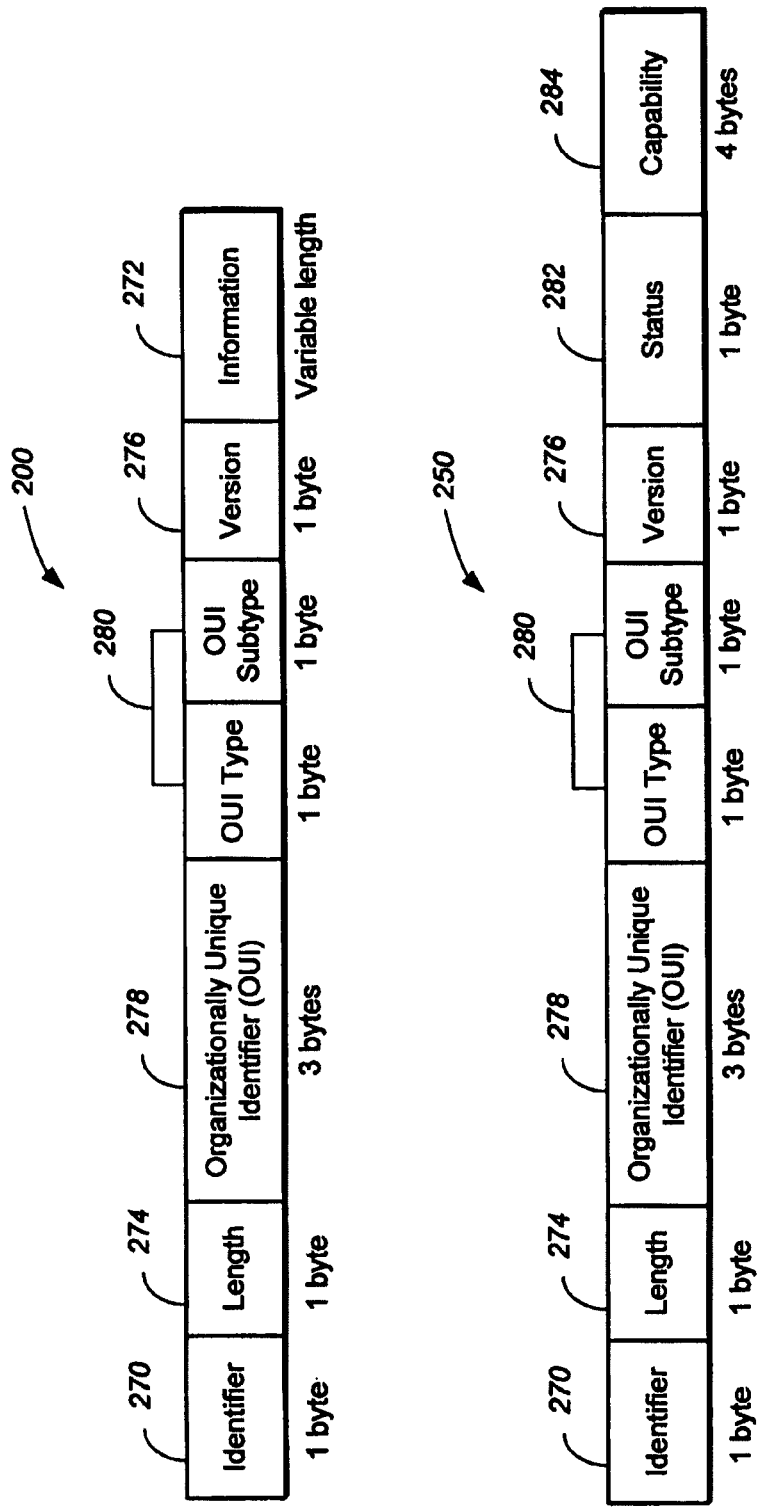
FIG._4

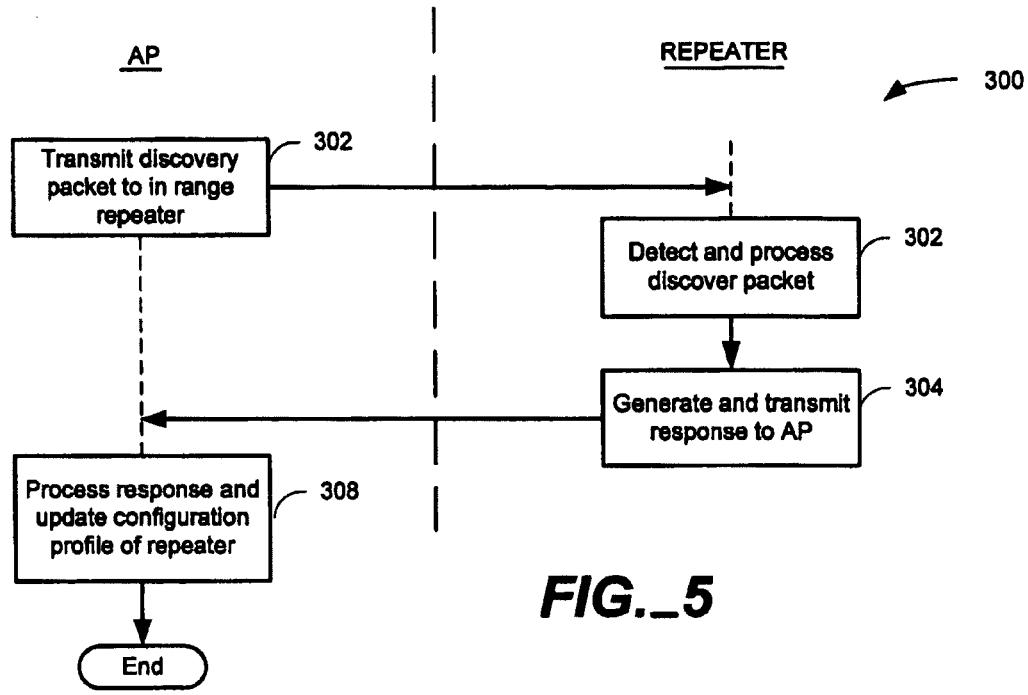
FIG._5
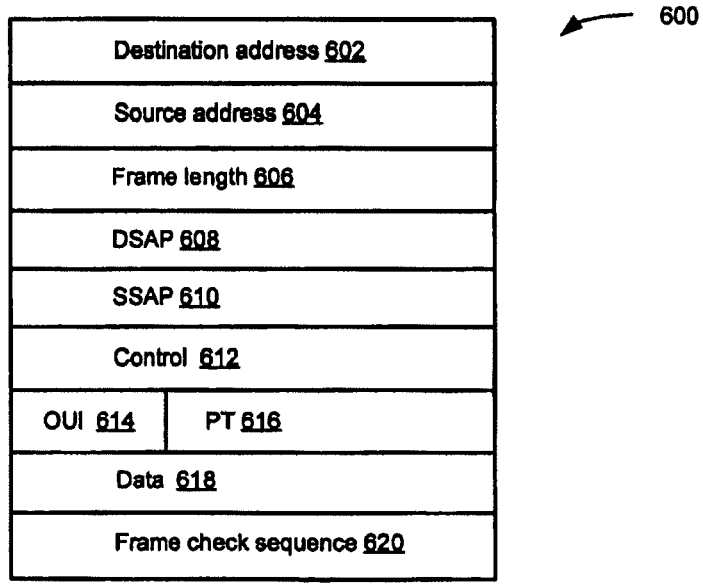
FIG._6

CONFIGURATION OF A NETWORK DEVICE

CROSS-REFERENCE TO RELATED APPLICATIONS

This application is a divisional application of U.S. patent application Ser. No. 10/961,777, filed Oct. 8, 2004, and issued on Mar. 6, 2012, as U.S. Pat. No. 8,131,209, which is incorporated herein by reference in its entirety.

BACKGROUND

Many wireless network devices (i.e., wireless stations) are available to facilitate data communications and network access at home and in the workplace, including wireless access points, wireless clients, wireless bridges, wireless repeaters, and wireless enabled laptop computers and personal digital assistants.

In a conventional wireless local area network (WLAN), an access point (AP) is a station that transmits and receives data (sometimes referred to as a transceiver). A conventional AP connects users to other users within the network and also can serve as the point of interconnection between the WLAN and a fixed wire network. Each AP can serve multiple users within a defined network area. As users move beyond the range of one AP, the user can be automatically handed over to a next one. Alternatively, the range of an AP can be extended using, for example, a wireless repeater.

A wireless repeater provides connectivity between devices in a wireless network. For example, a wireless repeater can be used to extend the range, and hence the connectivity of, a conventional wireless AP. Traditionally, a wireless repeater acts as a pass through device, which receives data from a first wireless device and transmits the data to other devices in a WLAN. The pass through device provides signal boost so as to effectively extend the range of the initial transmitting device (e.g., the AP). One or more wireless clients in a WLAN can communicate with the AP using the wireless repeater. The AP can be coupled to a wired network, for example over a cable, and provide connectivity for the wireless clients to the wired network.

A conventional wireless repeater includes two WLAN ports for communicating with two wireless devices (an upstream device, such as an AP, and one or more downstream devices, such as wireless clients). In addition, conventional wireless repeaters include one or more wireless applications for exchanging data between the WLAN ports, a wired port for communicating with a configuration device (i.e., a laptop computer), a web server, and code and graphics for supporting the configuration process.

In order to provide connectivity, the wireless repeater must be configured. Configuration includes set-up including the selection of a channel, security options, mode of operation along with other configurable parameters. Configuration may also include periodic status checks. A user installing a wireless repeater in a WLAN typically must configure the wireless repeater out of the box, using, for example, a laptop computer that is coupled by a hard-wired connection to the wired port of the wireless repeater.

Wireless repeaters are typically shipped with a default configuration to allow connection of wireless clients, but most require an elaborate and confusing manual configuration procedure to set up. For example, the following instructions describe how to manually configure a particular wireless repeater.

A user couples a laptop computer to a wired port on the wireless repeater. The user then opens a client configuration program for the wireless repeater. A new wireless network configuration can be generated or a default configuration edited. To connect to an upstream device (e.g., an AP), the upstream device is activated. The user must enter a network name or Secure Set ID (SSID) name for the network. Alternately, the user can scan for an available network. To specify a name, the user looks for a network name or SSID option in the configuration utility. The user must ensure that their wireless repeater's network card's name or SSID setting is identical to the network name or SSID assigned to the upstream device (e.g., the AP). The user enables a security selection, for example enabling wired equivalent privacy (WEP) encryption and enters one or more keys. The keys on the user device and upstream device must be identical and the same key type (encryption level and hexadecimal or ASCII format) must be used on every device. The user then saves the configuration and attempts to connect the user device to the upstream device. The process may be further complicated if the wireless repeater uses a different configuration (e.g., a different channel or different keys) to communicate to downstream devices.

SUMMARY

In one implementation, a wireless station is provided that includes a transmitter to wirelessly transmit discovery packets to a proximately located repeater, a receiver to receive a repeater input from the proximately located repeater over a wireless link, the repeater input including repeater configuration and state information and an engine to generate a configuration interface for displaying and controlling a configuration of the repeater. The engine is responsive to display to a user the configuration and state information associated with the repeater.

Aspects of the invention can include one or more of the following features. The discovery packets can be data packets comprising IEEE 802.0 fields with a Sub-Network Access Protocol (SNAP) field comprising a protocol identification field in a SNAP header including 3 bytes representing an organizationally unique identifier (OUI) and 2 bytes representing a product type. The engine can display a graphical user interface including the configuration and state information associated with the repeater. The engine can manage a configuration of the repeater.

The discovery packets can be data packets that include a repeater inquiry for determining state information related to the repeater. The repeater inquiry can be selected from the group consisting of link status inquiry, associated station inquiry, site survey inquiry, configuration inquiry, event log, battery status inquiry, background noise inquiry, channel metrics inquiry, and retry inquiry.

The discovery packets can be data packets that include a repeater command for configuring the repeater. The repeater command can be selected from the group consisting of reset, scan, SSID broadcast and set, RF mode set, channel set, access control list set, protection mode set, security mode set, transmit rate set, beacon interval set, request to send threshold set, DTIM interval set, QOS information set and power savings mode set.

A detector can be included for detecting a presence of a repeater in close proximity to the wireless station. A power selector can be included that is operable to control a power level output by the transmitter and enable transmission at low power when configuring a proximately located repeater. The engine can further comprise a configuration engine operable to process repeater input and configure the proximately located repeater upon receiving user instruction. The engine can further comprise a configuration engine operable to manage plural repeaters in a wireless local area network. The transmitter and the receiver can transmit and receive respectively in accordance with one or more of the following IEEE wireless communication protocols: 802.11, 802.11a, 802.11b, 802.11g, 802.11n, 802.16 and 802.20. The wireless station can be an access point or a client.

In another aspect, a method is provided for configuring a repeater using a wireless station. The method includes placing a wireless station in range of a repeater, wirelessly broadcasting discovery packets to the repeater and detecting the repeater including processing a repeater response to the discovery packet where the repeater response includes configuration and state information associated with the repeater. The method includes displaying a user interface to a user to allow for the configuration of the repeater including displaying the configuration and state information.

In another aspect, a repeater is provided including a detector for detecting a presence of a proximately located wireless station, a receiver for receiving discovery packets from an in range wireless station, and a configuration engine for processing the discovery packets transmitted wirelessly by the wireless station. The processing includes determining if the discovery packet includes a command to configure the repeater, and processing the command if any and producing configuration information related to an execution of the command. The repeater includes a transmitter for transmitting wirelessly the configuration information in a response back to the wireless station.

Aspects of the invention can include one or more of the following features. The repeater can include a status engine for processing discovery packets that include inquiries, the processing including determining a state of the repeater and generating state information. The transmitter can be operable to wirelessly transmit the state information in a response back to the wireless station. The state information can include state and capability information associated with the repeater. The detector can be operable to detect a presence of the wireless station in close proximity to the repeater including detecting discovery packets broadcast by the wireless station. The repeater can include a power selector operable to control a power level output by the transmitter and enable transmission at low power when being configured.

In another aspect, a method for managing a repeater in a wireless local area network is provided that includes locating an in range wireless station, receiving over a wireless link a discovery packet from the wireless station, processing the discovery packet including parsing the discovery packet to locate a command for configuring the repeater, and generating configuration information associated with the repeater. The configuration information includes an execution information relating to an execution of the command. The method includes wirelessly transmitting the configuration information to the wireless station.

In another aspect a data structure is provided for use in configuring a repeater in a wireless local area network. The data structure includes IEEE 802.0 fields with a Sub-Network Access Protocol (SNAP) field comprising a protocol identification field in a SNAP header including 3 bytes representing an organizationally unique identifier (OUI) and 2 bytes representing a product type; and a data field including one of an inquiry or a command for use in assessing a state of or configuring a repeater.

Systems and methods are provided for setting up an initial configuration of a wireless repeater using a wireless link to an upstream device (e.g., an AP). By way of example, an AP will be used to refer to the upstream device throughout this specification. Other upstream devices are possible including software based APs (i.e., a SoftAP) running on a host device and other wireless devices.

Configuration information is shared between an AP and wireless repeater in a manner designed to minimized security compromises, such as unwanted snooping. Further, the wireless repeater configuration information can be stored in the AP to facilitate ready configuration of plural repeaters in a WLAN.

The wireless repeater can be minimally configured (e.g., less RAM, no webserver, no graphics or UI etc.) to reduce cost, complexity, size and power consumption of the wireless repeater. Configuration information can be stored in an AP, along with a configuration utility accessible by a user to configure a wireless repeater. When adding multiple repeaters to a WLAN, the usage of complex manual configuration utilities for each wireless repeater can be avoided. The system proposed provides centralized management and configuration for wireless repeaters in a WLAN.

Other features and advantages are apparent from the following description, and from the claims.

DESCRIPTION OF DRAWINGS

FIG. 1 is a block diagram of an exemplary network.
FIG. 3 is an interaction diagram of a process to set-up a wireless repeater initially using an AP having a graphical user interface (GUI).
FIG. 4 is a block diagram of an exemplary probe request frame.
FIG. 5 is an interaction diagram of a process to manage a wireless repeater using an AP.
FIG. 6 is a block diagram of an exemplary discovery packet.
Like reference symbols in the various drawings indicate like elements.

DETAILED DESCRIPTION

Figure 2A:
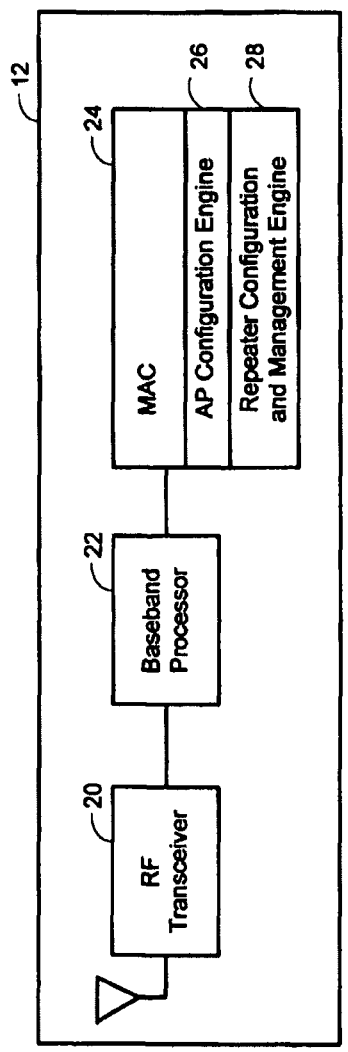
FIGS. 2A and 2C are block diagrams of an exemplary AP.

FIG. 1 is a block diagram of a network 10. In network 10, an access point (AP) 12 is provided and allows multiple clients (e.g., wireless clients 14) to connect with multiple systems 16 through, for example, a router or switch 18. Standards, such as IEEE 802.11, 802.11a, 802.11b, 802.11g, 802.11n, 802.16 and 802.20, for example, specify the technologies for wireless communications (e.g., wireless local area networks (WLANs)). In the configuration shown in FIG. 1, the AP 12 communicates wirelessly with both wireless clients 14 and router 18. Other configurations are possible, including wired connections to clients and other network devices (e.g., router 18).

With respect to wireless communications, the AP 12 has a finite range. The AP 12 receives and transmits data between the wireless clients 14 and the multiple systems 16, using one or more wireless repeaters 15 (hereinafter repeater). Repeaters 15 serve to extend the range of AP 12. Thus, the AP 12 enables access to server resources associated with the multiple systems 16 for each client.

In a particular example, the AP 12 can be a transceiver including both a transmitter and a receiver for wireless communication. As shown in FIG. 2A, an AP 12 embodied as a transceiver includes, for example, a radio frequency (RF) transceiver 20, a baseband processor 22 and a media access controller (MAC) 24. RF transceiver 20 receives and transmits data from/to wireless clients 14 and other network devices including repeaters 15. Baseband processor 22 processes the RF signals from/to baseband in conformance with a radio frequency transmission protocol in use by the AP 12. MAC 24 includes one or more processing engines for processing received/and to be transmitted signals and interfacing with the network components.

MAC 24 includes an AP configuration engine 26 for initializing and updating configuration information with clients 14. AP configuration engine 26 can be used to generate a service set identifier (SSID), secure key and personal identification numbers (PIN) as required. AP configuration engine 26 can be of the form of hardware (circuits), software, firmware or combinations thereof. MAC 24 further includes a repeater configuration and management engine 28 for use in configuring and managing the various repeaters 15 in network 10. MAC 24 can include one or more interfaces (not shown) for communication with other network components, including wired Ethernet, blue tooth, universal serial bus (USB) and a short distance point to point wireless link (e.g., infrared or blue tooth). The AP 12 transmits configuration and discovery packets and sends exchanges messages with proximately located wireless clients 14 and repeaters 15 (in one implementation, using low power). Methods for configuring clients are described in greater detail in co-pending and commonly assigned United States Patent Application entitled "Access Point Configuration" filed Jul. 9, 2004, and assigned Ser. No. 10/888,307, the contents of which are expressly incorporated herein by reference.

Figure 2C:
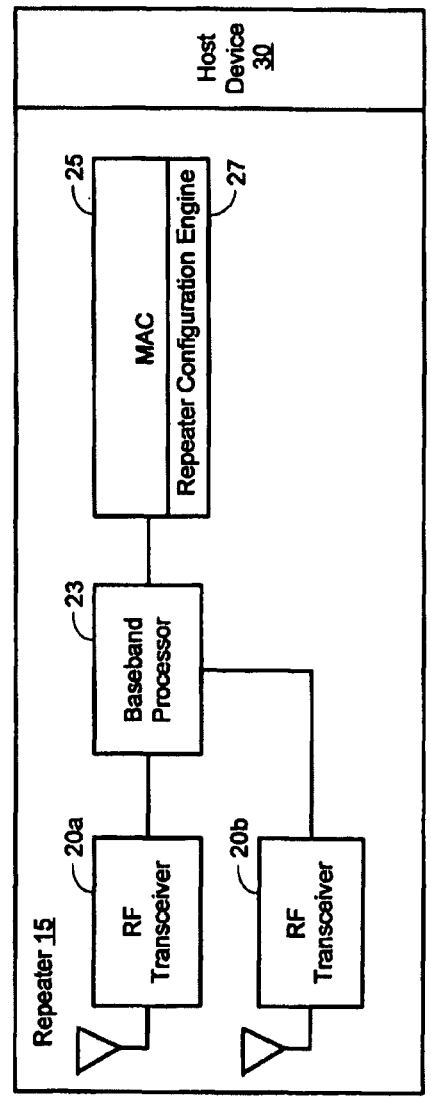
Figure 2B:
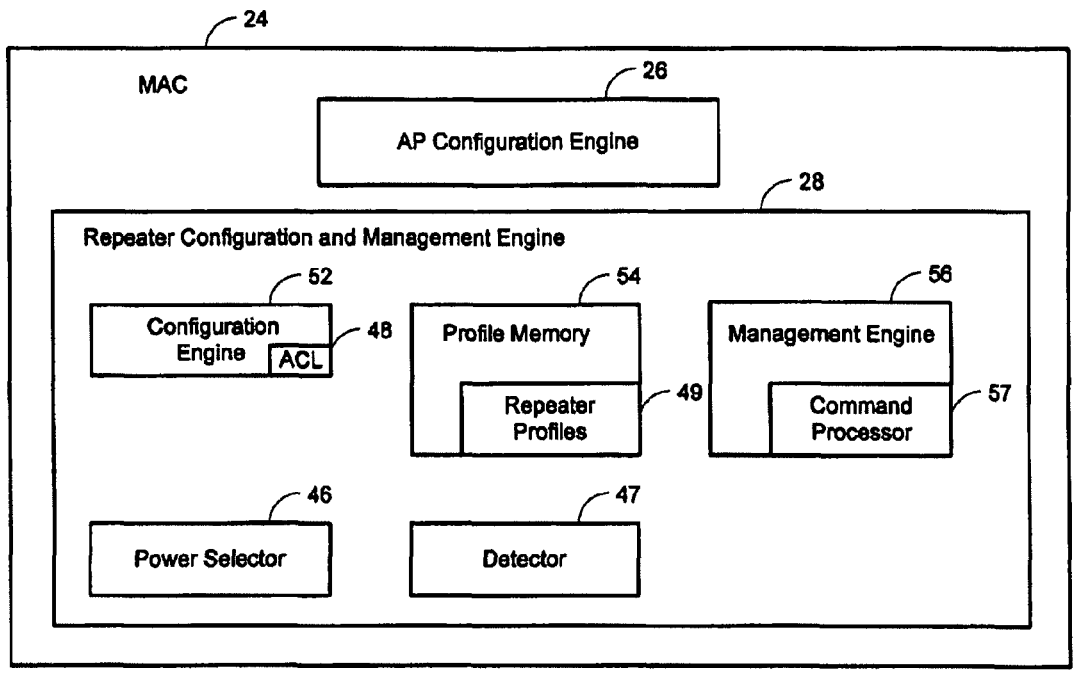
FIGS. 2B and 2D are block diagrams of an exemplary wireless repeater.

Referring now to FIGS. 1 and 2B, the AP MAC 24 is shown in greater detail. AP configuration engine 26 can be used to configure client devices as described in "Access Point Configuration" including the generation of service set identifiers (SSIDs), encryption keys and the like. Repeater configuration and management engine 28 can be used to configure and manage repeaters 15 in network 10. Repeater configuration and management engine 28 includes configuration engine 52, profile memory 54, management engine 56, power selector 46 and detector 47.

Configuration engine 52 includes a graphical user interface for facilitating the configuration of one or repeaters 15 in network 10. In one implementation, configuration engine 52 includes a webserver and software for generating a graphical user interface accessible by a user to configure and manage one or more repeaters 15. Configuration engine 52 generates and processes configuration packets and messages received from/transferred to repeaters 15. More specifically, configuration engine 52 generates discovery packets for transmission to, and processes responses including capability and state information from repeaters 15. Configuration engine 52 can include an access control list (ACL) 48. In one particular example, the ACL 48 is a table that tells the AP 12 whether access rights are granted to a particular client 14 coupled to a given repeater 15. The ACL 48 can be stored in profile memory 54. In addition, repeater profiles 49 that reflect the configuration and state of a repeater coupled to the AP 12 can be stored in profile memory 54.

Management engine 56 is operable to manage state and configuration of repeaters 15 in network 10. Management engine 56 includes command processor 57 for generating management commands to repeaters 15 and for processing repeater responses thereto. Management engine 56 can store state information for a given repeater in a repeater profile that may be maintained in profile memory 54.

Power selector 46 is operable to change the transmission output power for the transceiver 20 (FIG. 2a). In one implementation, while broadcasting transmissions to repeaters 15 during configuration, power selector 46 reduces the transmission output power to a low power level (e.g., 2 dBm) for a predetermined period to avoid snooping.

Detector 47 is operable to detect repeaters 15 within a predetermined range (e.g., proximately positioned repeaters). In one implementation, detector 47 detects configuration packet requests broadcast from a repeater 15. Alternatively, detector 47 detects using other conventional technologies including infrared detection technology, or detection of responses to broadcast discovery packets generated by the AP 12.

Referring to FIG. 2C, a repeater 15 may include a transceiver similar to the AP transceiver for interacting with the AP 12. The repeater transceiver can include a first transceiver 20a, baseband processor 23 and a MAC 25. Further, repeater 15 can include a second transceiver 20b for receiving and transmitting data to one or more downstream devices. In one implementation, only a single transceiver is required for both upstream and downstream communications. In the configuration shown in FIG. 2C, repeater 15 includes RF transceiver 20a operable to receive and transmit data from/to the AP 12 and RF transceiver 20b operable to receive and transmit data from/to one or more local clients 14. Baseband processor 23 processes the RF signals from/to baseband in conformance with a radio frequency transmission protocol in use by the AP 12 and/or the clients 14. MAC 25 includes one or more processing engines for processing received/and to be transmitted signals and includes a repeater configuration engine 27 for initializing and updating configuration information with the AP 12. Repeater configuration engine 27 can be of the form of hardware (circuits), software, firmware or combinations thereof. MAC 25 can provide a network interface to an optional host device 30 resident on the repeater 15 or to the downstream clients 14.

Repeater 15 is operable to transmit configuration request packets to, or otherwise signal a proximately located AP 12 (in one implementation, using low power), and send messages to and receive messages from the AP 12. In addition, repeater 15 is operable to provide a conduit between the AP 12 and downstream clients 14. Repeater configuration engine 27 interacts with the repeater configuration and management engine 28 in AP 12 (FIG. 2B) to initialize or update configuration information in the repeater 15.

The repeater 15 may also include one or more input, output (I/O) devices (e.g., a button, a keyboard, and a GUI) and routines for interacting with a user (e.g., set-up routines, GUI routines), though in an exemplary implementation, no such additional I/O devices or routines are required to configure/operate the repeater 15.

Figure 2D:
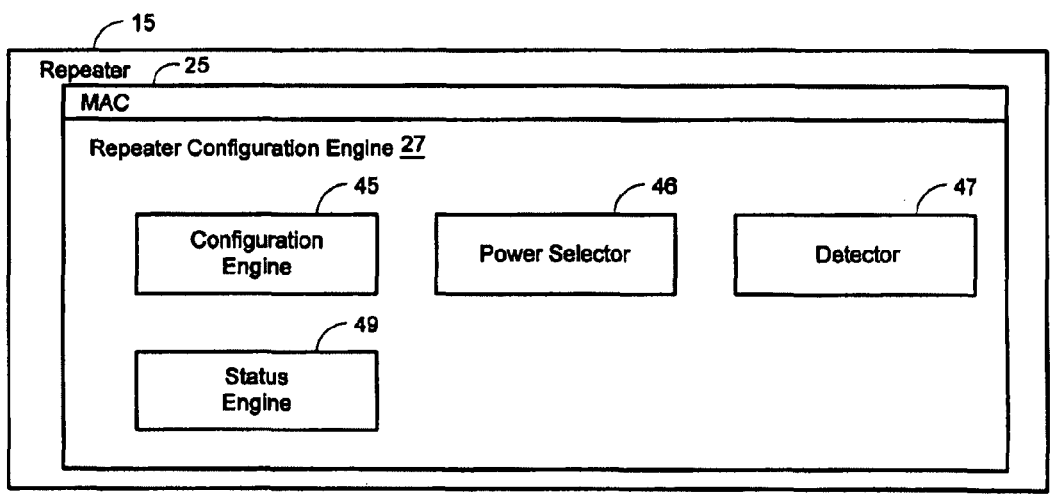

Referring now to FIG. 2D, the repeater MAC 25 is shown in greater detail. Repeater configuration engine 27 includes a configuration engine 45, power selector 46, detector 47 and status engine 49. In general, the function and operation of the respective engines is similar to that of the corresponding engines (but from the perspective of the repeater) in the AP 12, the details of which are discussed in greater detail below.

Configuration engine 45 can generate configuration request packets for transmission to, and processes responses or discovery packets received from AP 12. More specifically, the processing of discovery packets can include parsing the discovery packet to determine if a repeater command is contained therein. If so, the configuration engine 45 can process the command and generate command information including execution information related to the command. The execution of commands is discussed in greater detail below.

Power selector 46 is operable to change the transmission output power for the transceiver in the repeater 15. In one implementation, while broadcasting transmissions to the AP during configuration, power selector 46 reduces the transmission output power to a low power level (e.g., 2 dBm) for a predetermined period to avoid snooping.

Detector 47 is operable to detect APs within a predetermined range (e.g., proximately positioned APs). In one implementation, detector 47 detects discovery packets broadcast by the AP 12. Alternatively, detector 47 detects using other conventional technologies including infrared detection technology.

Status engine 49 is responsive to inquiries received from the AP 12 to provide status information regarding the operation of the repeater 15. AP 12 can re-configure/tune the configuration of the repeater 15 after the initial configuration has been set. Discovery packets transmitted by the AP 12 can include configuration commands and state requests (i.e., inquiries). State and configuration requests are discussed in greater detail below.

In one implementation, the repeater 15 includes a wide variety of configuration settings that are preset at the time of manufacture but manually configurable by a user. For example, the repeater 15 can include a default service set identifier (SSID) parameter. The SSID defines the name of a wireless network that clients associate with. To improve security, a user changes the SSID to a non-default value to minimize unauthorized users from associating with the repeater.

The repeater 15 can include an encryption parameter. In one implementation repeater 15 supports wired equivalent privacy (WEP) encryption, which encrypts the frame body (not headers) of each data frame. Other encryption protocols including Wireless Application Protocol (WAP) can be supported.

FIG. 3 is an interaction diagram of a process 100 to set-up a repeater initially using an AP having a graphical user interface (GUI). The AP can be a conventional AP (e.g., as described above with respect to AP 12 in FIG. 1), a personal computer including a software based AP (e.g., a SoftAP as described in copending and commonly owned Patent Application entitled "Active Network System For Wireless Computer Networks", filed Apr. 16, 2004, and assigned Ser. No. 10/826,171, the entire contents of which are expressly incorporated herein by reference), a router or other network device. Referring to FIGS. 1, 2A-D, and 3, process 100 includes placing (102) an AP 12 within range of a repeater 15. In one implementation, the AP 12 and repeater 15 are placed in close proximity (e.g., less than 14 meters apart if wireless). The repeater 15 can be linked to the AP 12 either wirelessly (e.g., using a wireless discovery service (WDS) link) or by a physical link, such as, for example, Ethernet, hardwire (e.g., firewire), serial, Universal Serial Bus (USB) or a short distance point-to-point wireless link (e.g., infrared or bluetooth). In one example implementation, the repeater 15 and the AP 12 are wirelessly linked. Other communications between the AP 12 and the client 14 can be wireless or wired.

The AP 12 and repeater 15 are powered on (104) and each detects/infers (e.g., using detector 47) the presence of the other device (106). In one implementation, AP 12 generates (e.g., using configuration engine 52) and broadcasts discovery packets (e.g., using the transceiver 20 in AP 12) to the repeater 15 (e.g., at low power using the power selector 46 to prevent unwanted snooping when transmitted wirelessly) (108). In a particular example, discovery packets are multicast at 2 dBm. Multicasting can be continuous or for a predetermined period of time. If the repeater 15 and the AP 12 are connected by a physical linked (hereafter referred to as "wired"), the AP 12 transmits discovery packets to the repeater 15 using the physical link. Alternatively, the repeater 15 can infer the presence of the AP 12 and enter a default configuration mode. For example, the repeater may enter the configuration mode at power up. After power up, the AP 12 enters the configuration mode and awaits input from the client.

As described above, process 100 includes the repeater 15 detecting the presence of AP 12 and, in response thereto (e.g., in response to a discovery packet), generating (e.g., using the status engine 49) and transmitting a repeater profile to the AP 12 (110). In one implementation, the repeater profile includes state and capability information.

In one implementation, state information indicates the current state of the repeater 15 and can reflect at least whether the repeater 15 is configured and if so, by whom, e.g., out of the box. In one implementation, the state information can indicate whether the repeater 15 was configured with default settings, configured automatically (e.g., using a configuration process as described herein), configured using a WEB GUI or configured by a parent AP.

Capability information in the repeater profile reflects the basic and extended capabilities of the repeater. In one implementation, capability information in the repeater profile can include an indication of security capability (e.g., WPA and WPA2 capable), radio frequency capability (e.g., 802.11a, b or g, dual capability, and domain), and network capability (e.g., routing, AP, and Dynamic Host Configuration Protocol (DHCP) and Quality of Service (QoS)).

In one implementation, the repeater profile is provided as part of a response to a probe request frame using a specific wireless media (e.g., 802.11a, b or g channels) and frame format (e.g., WDS) so as to make the AP 12 aware of the repeater 15. FIG. 4 is a block diagram of an exemplary probe request frame 200. In one specific implementation, the probe request frame 200 includes 1 byte of identifier 270, a variable length information field 272 and associated 1 byte length field 274 and 1 byte version field 276, 3 bytes representing an organizationally unique identifier (OUI) 278 and 2 bytes representing a product type (PT) 280.

In one particular implementation, the response 250 from the repeater 15 includes a similar frame structure and additionally 1 byte status field 282 and a 4 byte capability field 284. In one implementation, the status field includes information regarding who and how the repeater was configured (e.g., with default settings, by a parent AP, using a WEB GUI, etc.). In one implementation, the capability information field includes security support bits (e.g., WPA, and WPA2 support), RF capability bits (e.g., 802.11a, b or g), and network capability bits (e.g., routing, QoS, etc.)

Returning again to FIGS. 1, 2A-D and 3, AP 12 receives the repeater profile including capability and state information and, in response, a set-up utility routine (e.g., using configuration engine 52) in the AP generates (112) a configuration graphical user interface (GUI) displaying the repeater profile.

A user can review the repeater profile and decide whether to configure the repeater 15. In one implementation, if the repeater needs to be configured, the user will be prompted to bring the repeater 15 into close proximity to the AP 12. In this implementation, configuration of the repeater 15 by the AP 12 can be performed at low power (e.g., selectors 47 in AP 12 and repeater 15 can adjust the power level of transceivers in the respective devices to transmit required configuration data at low power to avoid unwanted snooping). If the repeater needs to be configured, the AP can execute a set-up wizard and configuration can proceed, including the transmission by the AP of configuration packets to the repeater 15 (114). An example of a configuration process for a repeater (e.g., a repeater being one example of a client device) is described in "Access Point Configuration". Alternatively, AP 12 can send one or more commands to configure repeater 15. The process for sending commands and receiving state information is described in greater detail below.

FIG. 5 is an interaction diagram of a process 300 to query or command an already configured repeater. An AP can inquire, manage, maintain and configure one or more repeaters in a network. Referring now to FIGS. 1, 2A-D and 5, process 300 includes an AP 12 transmitting a discovery packet (302) to an in range repeater 15. As described above, the repeater 15 can be linked to the AP 12 either wirelessly or by a physical link (i.e., for configuration), such as, for example, Ethernet, hardwire, serial, Universal Serial Bus (USB) or a short distance point-to-point wireless link (e.g., infrared or blue tooth). In an exemplary implementation, the repeater 15 is connected to the AP 12 using a wireless link. In a particular example, discovery packets are multicast at 2 dBm and detected by the repeater 15.

The repeater 15 detects and processes (304) the discovery packet (e.g., using configuration engine 45). Processing includes parsing the inbound discovery packet to determine what action is required and executing a requested action (command or inquiry if required). After processing, a response is generated and transmitted (306) to the AP 12. Thereafter the AP can process (308) the repeater response including update a configuration profile for the repeater as necessary and initiate another inquiry or command as required. Thereafter the process ends.

In one implementation, the AP 12 can send inquiries and commands. Inquiries are used to determine the state of the repeater 15 including performance information (e.g., receive signal strength indicator (RSSI) from AP to repeater or from repeater to an associated client). Commands can be used by the AP 12 to configure initially, re-configure, provision, or control the repeater 15.

In one implementation, the discovery packet sent by an AP 12 is of the form of a layer 2 configuration packet. Referring now to FIG. 6, in this example, the configuration packet 600 format is IEEE 802.0 with a Sub-Network Access Protocol (SNAP) field. In a particular example, a protocol identification field in the SNAP header contains 3 bytes representing an organizationally unique identifier (OUI) and 2 bytes representing a product type (PT).

In this particular example, the configuration packet 600 includes a 6-byte destination address 602, a 6-byte source address 604 and 2-byte frame length 606. The configuration packet 600 includes a destination service access point (DSAP) field 608, a source service access point (SSAP) field 610, a control field 612 and, as described above, a SNAP header containing 3 bytes representing an OUI 614 and 2 bytes representing a PT 616. The configuration packet 600 also includes 100 bytes of data 618 and 4 bytes representing a frame check sequence 620.

In one implementation, the difference between discovery packets sent and responses received lies in the data portion. More specifically, the data portion of a command (either inquiry or control command) from an AP 12 to a repeater 15 can have the following exemplary format: a command code (2 bytes), a command body (variable size) and associated length field (2 bytes), a sequence number assigned by the sender (2 bytes). In one implementation, the inquiry commands available for use by the AP and transmission to the repeater include a link status inquiry, an associated station inquiry, a site survey inquiry, a configuration inquiry, an event log inquiry, a battery status inquiry, a background noise inquiry, channel metrics inquiry, and retry inquiry (to determine the number of retries on average or otherwise). Other inquiries are possible.

When a link status inquiry is requested, the repeater provides a link status response. In one implementation, the link status response transmitted by a repeater 15 can have the following exemplary format: a command code indicating a link status request was received (2 bytes), a command body (variable size) and associated length field (2 bytes), a sequence number assigned by the sender (2 bytes), a result field (2 bytes, indicating the command execution result), a remote RSSI field (2 bytes indicating RSSI of packets sent by the AP when received by the repeater), a remote stations field (2 bytes indicating the number of remote stations associated with the repeater), total transmit (Tx) packet field (4 bytes, indicating total number of packets transmitted since last reset), total received (Rx) packet field (4 bytes, indicating total number of packets received since last reset).

When an associated station inquiry is requested, the repeater provides a station status response. In one implementation, the station status response transmitted by a repeater 15 can have the following exemplary format: a command code indicating a station request was received (2 bytes), a command body (variable size) and associated length field (2 bytes), a sequence number assigned by the sender (2 bytes), a result field (2 bytes, indicating the command execution result), and fields for total records (2 bytes) and station data (10 bytes) where the station data includes station MAC address (6 bytes), station RF mode (2 bytes) and station's RSSI (2 bytes).

When a site survey inquiry is requested, the repeater provides a site survey response. In one implementation, the site survey response transmitted by a repeater 15 can have the following exemplary format: a command code indicating a site survey request was received (2 bytes), a command body (variable size) and associated length field (2 bytes), a sequence number assigned by the sender (2 bytes), a result field (2 bytes, indicating the command execution result), and fields for total records (2 bytes), record length and record data (variable) where the record data includes SSID length (1 byte), SSID (variable), BSSID (6 bytes), channel number (1 byte), communication mode (e.g., ad hoc, etc.) (1 byte), RF mode (1 byte), security field (1 byte) and RSSI (2 bytes).

When a configuration information inquiry is requested, the repeater provides a configuration response. In one implementation, the configuration response transmitted by a repeater 15 can have the following exemplary format: a command code indicating a configuration information survey request was received (2 bytes), a command body (variable size) and associated length field (2 bytes), a sequence number assigned by the sender (2 bytes), a result field (2 bytes, indicating the command execution result and including plural results depending on the number of configurations available/in use), and fields for each configuration (i.e., configuration data) (variable) including the number configuration records (1 byte) where the configuration data includes a length field and data for the configuration record.

When an event log inquiry is requested, the repeater provides an event log response. In one implementation, the event log response transmitted by a repeater 15 can have the following exemplary format: a command code indicating an event log request was received (2 bytes), a command body (variable size) and associated length field (2 bytes), a sequence number assigned by the sender (2 bytes), a result field (2 bytes, indicating the command execution result and including plural results depending on the number of events), and fields for each event (i.e., event data) (variable) including the number of event records (1 byte) where the event data includes a length field and data for the event record.

In one implementation the commands available for use by an AP (e.g., AP 12 of FIG. 1) to configure, manage and control the repeater include reset request (reset repeater), scan request (scan for wireless links), SSID broadcast and set, RF mode set (e.g., 802.11a, b or g), channel set, access control list set (to specifically deny client access), protection mode set, security mode set (e.g., WEP, WPA, WPA2, etc.), Tx rate set, beacon interval set, RTS (request to send) threshold set, DTIM (Delivery Traffic Indication Message) interval set, QoS information set and power savings mode set. Other configuration commands can include MAC filtering for screening content available to certain stations connected to a repeater.

In one implementation, the command format for each command transmitted by the AP 12 to the repeater 15 includes both a command code, and command data. Command data can be of the form of SSID data (e.g., SSID, SSID length and SSID security for a SSID set command), RF mode information (e.g., 802.11a, b or g etc., for an RF mode command), channel identifier (for a channel set command), MAC data (including access control information including MAC addresses and corresponding control (e.g., restrict/allow/deny) data), protection mode data, security data (including security selection and keys, ID, pass phrase and encryption type), transmit rate (for Tx set command), beacon interval value (for beacon interval set command), RTS threshold data, and DTIM interval data.

In one implementation, the response format for most commands used to configure, manage and control the repeater can have the following exemplary format: a command code (2 bytes), a command body (variable size) and associated length field (2 bytes), a sequence number assigned by the sender (2 bytes) and a command result (2 bytes) indicating the command execution state.

A number of implementations have been described. Nevertheless, it will be understood that various modifications may be made. For example, a single command or response packet can be configured to include multiple command or response codes to reduce the number of packets required to be transmitted. Further, though the discussion above is directed to initializing repeaters, similar methods can be used to re-initialize (i.e., update) repeaters that have been relocated, have been configured to link to other systems, and are returning to be linked again to a configured AP. Further, though the discussion above makes reference to a an AP as the agent for configuring a repeater, other devices (e.g., a client) can be used including other forms of wireless stations. Though the various engines and components have been described above as separate, plural components can be combined in singular circuitry, engines, programs or the like. The methods described may be implemented in embedded systems, hardware, firmware, software, or combinations thereof, or in a computer program product tangibly embodied in a computer readable storage device. Storage devices suitable for tangibly embodying the computer program include all forms of non-volatile memory including semiconductor memory devices. Accordingly, other implementations are within the scope of the following claims.

What is claimed is:

1. A wireless station comprising:
a transmitter to wirelessly transmit discovery packets to a proximately located network device, wherein the discovery packets include a request for configuration and state information associated with the proximately located network device, and the discovery packets are transmitted at a first power;
a receiver to wirelessly receive an input from the proximately located network device, the input including the configuration and state information associated with the proximately located network device, wherein the input is transmitted by the proximately located network device at the first power, and the configuration and state information includes one or more of a service set identifier (SSID) parameter, a security capability parameter, a radio frequency capability parameter, or a network capability parameter;
an engine to manage a configuration of the proximately located network device, the engine to indicate the configuration and state information associated with the proximately located network device; and
a power selector to control a power level output by the transmitter, enable transmission at the first power during configuration of the proximately located network device, and enable transmission at a second power after configuration of the proximately located network device, wherein the first power is lower than the second power, the first power helps prevent snooping during the configuration, and the second power enables wireless communication with one or more other devices after the configuration of the proximately located network device,
wherein the proximately located network device is a repeater that extends a range of an access point on a wireless local area network (WLAN).

2. The wireless station of claim 1 wherein the discovery packets comprise IEEE 802.0 fields with a Sub-Network Access Protocol (SNAP) field comprising a protocol identification field in a SNAP header including 3 bytes representing an organizationally unique identifier (OUI) and 2 bytes representing a product type.

3. The wireless station of claim 1 wherein the discovery packets include an inquiry selected from the group consisting of link status inquiry, associated station inquiry, site survey inquiry, configuration inquiry, event log, battery status inquiry, background noise inquiry, channel metrics inquiry, and retry inquiry.

4. The wireless station of claim 1 wherein the discovery packets include a command for configuring the proximately located network device.

5. The wireless station of claim 4 wherein the command is selected from the group consisting of reset, scan, SSID broadcast and set, RF mode set, channel set, access control list set, protection mode set, security mode set, transmit rate set, beacon interval set, request to send threshold set, DTIM interval set, QOS information set, and power savings mode set.

6. The wireless station of claim 1 further comprising a detector for detecting a presence of the proximately located network device in close proximity to the wireless station.

7. The wireless station of claim 1 wherein the engine further comprises a configuration engine operable to process input and configure the proximately located network device upon receiving an instruction from a user.

8. The wireless station of claim 1 wherein the engine further comprises a configuration engine operable to manage plural network devices in a wireless local area network.

9. The wireless station of claim 1 wherein the transmitter transmits and the receiver receives in accordance with one or more of the following IEEE wireless communication protocols: 802.11, 802.11a, 802.11b, 802.11g, 802.11n, 802.16, or 802.20.

10. The wireless station of claim 1 wherein the wireless station is an access point.

11. The wireless station of claim 1 wherein the wireless station is a client.

* * * * *